(12) United States Patent
Scheim et al.

(10) Patent No.: US 11,597,580 B2
(45) Date of Patent: Mar. 7, 2023

(54) METHOD FOR PACKAGING SILICONE COMPOUNDS

(71) Applicant: WACKER CHEMIE AG, Munich (DE)

(72) Inventors: Uwe Scheim, Coswig (DE); Peter Schoeley, Diera-Zehren (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 16/765,725

(22) PCT Filed: Sep. 7, 2018

(86) PCT No.: PCT/EP2018/074181
§ 371 (c)(1),
(2) Date: May 20, 2020

(87) PCT Pub. No.: WO2020/048616
PCT Pub. Date: Mar. 12, 2020

(65) Prior Publication Data
US 2021/0362934 A1 Nov. 25, 2021

(51) Int. Cl.
| | |
|---|---|
| *B65B 7/00* | (2006.01) |
| *B65D 81/38* | (2006.01) |
| *B65D 83/00* | (2006.01) |
| *B65D 85/00* | (2006.01) |
| *C08L 83/04* | (2006.01) |

(52) U.S. Cl.
CPC ..... *B65D 81/3841* (2013.01); *B65D 83/0005* (2013.01); *B65D 85/70* (2013.01); *C08L 83/04* (2013.01)

(58) Field of Classification Search
CPC ..... C08L 83/04; B65D 83/0005; B65D 85/70; B65D 81/3841
See application file for complete search history.

(56) References Cited

U.S. PATENT DOCUMENTS

| | | | |
|---|---|---|---|
| 5,242,091 A * | 9/1993 | Ishida | B05C 17/00579 |
| | | | 222/386 |
| 5,338,312 A | 8/1994 | Montgomery | |
| 2006/0200084 A1* | 9/2006 | Ito | A61M 5/3129 |
| | | | 604/230 |
| 2016/0015898 A1* | 1/2016 | Jones | A61L 31/088 |
| | | | 604/230 |
| 2019/0218347 A1* | 7/2019 | Bruggeman | B01F 27/091 |
| 2019/0316204 A1 | 10/2019 | Park et al. | |
| 2020/0078523 A1* | 3/2020 | Mangold | A61M 5/3129 |

FOREIGN PATENT DOCUMENTS

| | | |
|---|---|---|
| DE | 4334754 C1 | 5/1995 |
| JP | 59115271 A | 7/1984 |
| JP | 2002011401 A | 1/2002 |
| JP | 2003104461 A | 4/2003 |
| JP | 2016064414 A | 4/2016 |
| KR | 20090052480 A | 5/2009 |
| WO | 2008034060 A2 | 3/2008 |
| WO | 2017018735 A1 | 2/2017 |
| WO | 2017/187356 * | 11/2017 |
| WO | 2017187355 A2 | 11/2017 |

\* cited by examiner

*Primary Examiner* — Margaret G Moore
(74) *Attorney, Agent, or Firm* — Brooks Kushman P.C.

(57) ABSTRACT

Silicone-containing cartridges having a plunger at one end thereof are effectively sealed against moisture penetration by introducing a silicone oil composition having a viscosity of from 5000 mPa·s to 100,000 mPa·s between the walls of the plunger and the interior surface of the cartridge wall.

9 Claims, No Drawings

METHOD FOR PACKAGING SILICONE COMPOUNDS

CROSS REFERENCE TO RELATED APPLICATIONS

This application is the U.S. National Phase of PCT Appln. No. PCT/EP2018/074181 filed Sep. 7, 2018, the disclosure of which is incorporated in its entirety by reference herein.

BACKGROUND OF THE INVENTION

1. Field of the Invention

The invention relates to a process for packaging silicone compositions in hollow cylindrical containers, which are sealed with a plunger, to cartridges filled with silicone compositions, and to a process for sealing the gap between the inner surface of the hollow cylindrical container and the outer surface of the plunger.

2. Description of the Related Art

Processes for filling RTV-1 sealants are known. They are frequently filled in containers which enable simple application. Particularly common is packaging in cartridges composed of polyethylene. It is the prior art in this case that the cylindrical cartridges are sealed with a plunger at the bottom end. These plungers must protect the RTV-1 sealants in the cartridges as efficiently as possible from penetration by atmospheric humidity. In addition, the plungers, which generally also consist of polyethylene or polypropylene, have to meet further important requirements. For instance, the plungers should be as easy as possible to place in the cartridge by mechanical means. For this purpose, the plunger is generally wetted prior to placement with a low viscosity silicone oil in the viscosity range 350 mPas to 1000 mPas. The result is that the plunger is smoothly inserted and any air in the cartridge forward of the plunger can be readily expelled such that no air bubble remains forward of the plunger. As shown in practice, however, the leak tightness achievable for long storage is still inadequate. In particular, the plunger has to further remain moveable also during the entire period of storage, since the composition in the cartridge expands in the case of an increase in temperature and contracts in the case of a decrease in temperature. If the mobility of the plunger is restricted, in the case of a decrease in temperature, this then results in a negative pressure forming in the cartridge. The negative pressure is equalized by air being sucked in from outside. This leads to increased hardening of the cartridge contents from the bottom up. It has now been shown in practice that lubrication of the plunger with low viscosity silicone oils does not produce any fundamental and durable remedy for the undesirable hardening in the cartridge. To date, this has been attributed to the fact that silicone oils have high permeability to water vapor, such that the silicone oil film does not protect against moisture penetrating. Compositions having a significantly lower water vapor permeability and thus guaranteeing additional waterproofing were therefore sought. DE-C1 4334754 describes such mixtures, consisting of polybutenes and waxes. In this document it is also stated that the use of hydrophobic liquids, for example plasticizers such as the aforementioned silicone oils, is insufficient since these materials have an excessive water vapor permeability and thus hardening in the region of the plunger head is not sufficiently prevented. By using polybutene, very good sealing of the plunger against the cartridge wall can be achieved. However, it has been shown that the mixture of polybutenes with waxes leads to contamination of the contents of the cartridge since these polymers are generally immiscible with silicone sealants. This therefore results in smear formation in the sealant at the lower end of the cartridge which is undesirable since these smears also remain visible after hardening of the sealant. Moreover, these mixtures are also difficult to apply due to their waxy consistency. In addition, the necessary long-lasting movability of the plunger is also not ensured in every case by the polybutene/wax mixtures.

SUMMARY OF THE INVENTION

The invention relates to a process for packaging silicone compositions in a hollow cylindrical container, which is sealed with a plunger, characterized in that in the gap between the inner wall of the hollow cylindrical container and the outer surface of the plunger, a silicone polymer (A) having a viscosity of 5000 mPas to 100,000 mPas, measured at 25° C., is introduced.

DETAILED DESCRIPTION OF THE PREFERRED EMBODIMENTS

In practice, the hollow cylindrical body filled with a sealant, which is sealed with a plunger, is frequently called a cartridge. In the context of the present invention, this entire package, i.e. the hollow cylindrical container, the silicone composition contained therein and at least one sealing plunger, which is also used to express the composition out of the opening of the cartridge, is referred to as a cartridge system. The hollow cylindrical container is preferably sealed at the end face by the manufacturer with a circular cap. This cap can be designed such that spray nozzles or any other devices can be attached thereto. This attachment is preferably achieved by screwing on by means of threads.

In the context of the present invention, the hollow cylindrical container optionally sealed at one end is also referred to as an empty cartridge.

In the context of the invention, the term hollow cylindrical cartridge also includes such containers or empty cartridges which are not ideally hollow cylindrical but as a consequence of manufacture and/or usage optimization have a diameter which, over the whole length of the empty cartridge, both along the central axis and in the respective individual circumference, may vary preferably up to 5%.

The plunger itself, with which the hollow cylindrical container is sealed, consists of the cylindrical wall, the outer surface of which abuts the inner surface of the empty cartridge after placement of the plunger, and the circular plunger head which abuts the filled silicone composition. Preferably, the plunger is open on the outward facing side. It thus itself practically forms a cylindrical hollow body. The particular position of the plunger in the hollow cylindrical container determines the size of the cavity.

The hollow cylindrical container used according to the invention, which is sealed with a plunger, is preferably selected from commercial empty cartridges, especially those composed of polyethylene which are commercially obtainable from, for example, Fischbach KG, Engelskirchen, Germany or Ritter GmbH, Schwabmünchen, Germany. Likewise, the plungers used according to the invention are preferably commercial products which are obtainable from these companies.

The silicone compositions to be packaged in accordance with the invention can be any silicone compositions, for example crosslinkable silicone compositions which can be used as adhesives or sealants, preferably silicone compositions crosslinkable at room temperature, so-called RTV-1 compositions, which harden upon admission of atmospheric humidity.

The silicone compositions to be packaged according to the invention are preferably paste-like substances at 20° C. and 1013 hPa, preferably with yield points of more than 500 Pa and preferably densities between 0.9 and 1.6 g/cm³. A typical application is, for example, sealing of building joints.

The silicone polymers (A) used according to the invention are preferably essentially linear organopolysiloxanes, more preferably those of the general formula

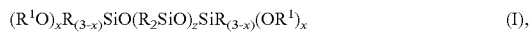

(I), where

R may be identical or different and is a monovalent, SiC-bonded, optionally substituted hydrocarbon radical, $R^1$ may be identical or different and is a hydrogen atom or a monovalent, optionally substituted hydrocarbon radical, which can optionally be interrupted by heteroatoms such as oxygen or nitrogen, x is 0, 1, 2 or 3 and z is an integer from 20 to 5000.

Examples of monovalent SiC-bonded hydrocarbon radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,4,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as cyclopentyl, cyclohexyl, cycloheptyl and methylcyclohexyl radicals; alkenyl radicals such as the vinyl, 1-propenyl, 2-propenyl, n-5-hexenyl, 4-vinylcyclohexyl and 3-norbornenyl radicals; aryl radicals such as the phenyl, biphenylyl, naphthyl, anthryl and phenanthryl radicals; alkaryl radicals such as o-, m-, p-tolyl radicals, xylyl radicals and ethylphenyl radicals; and aralkyl radicals such as the benzyl radical and the α- and β-phenylethyl radicals.

The radical R is preferably selected from monovalent, SiC-bonded hydrocarbon radicals having 1 to 18 carbon atoms, more preferably the methyl, ethyl, vinyl or phenyl radical, especially the methyl or vinyl radical.

Examples of radical $R^1$ are the radicals specified for R.

The radical $R^1$ is preferably selected from a hydrogen atom or alkyl radicals having 1 to 20 carbon atoms, more preferably a hydrogen atom, the methyl radical or the ethyl radical.

x is preferably 0, 1, or 2, more preferably 0.

The silicone polymers (A) used in accordance with the invention are preferably bis(trialkylsiloxy)polydialkylsiloxane, α,ω-dihydroxypolydialkylsiloxane or bis(dialkoxyalkylsiloxy)polydialkylsiloxane or mixtures thereof, particularly preferably bis(trialkylsiloxy)polydialkylsiloxane.

The essentially linear siloxanes preferably used in accordance with the invention based on D units may, as a consequence of manufacture, have a molar proportion of branchings, i.e. T and/or Q units, of preferably less than 5%, more preferably less than 1%, based in each case on the sum total of D, T and Q units.

The silicone polymer (A) used in accordance with the invention can be one type of a silicone polymer of this kind as well as a mixture of at least two types of silicone polymers, with the proviso that component (A) has a viscosity in the range of 5000 mPas to 100,000 mPas.

If the silicone polymer (A) used in accordance with the invention takes the form of mixtures, for example a mixture of two or more siloxanes of the formula (I), siloxanes having a viscosity of below 5000 mPas or above 10,000 mPas may also be used for the production thereof, with the proviso that component (A) has a mixed viscosity in the range of 5000 mPas to 100,000 mPas.

In addition, for the production of component (A) used in accordance with the invention, the silicone polymers can also be mixed homogeneously with organic solvents (B), with the proviso that component (A) has a mixed viscosity in the range of 5000 mPas to 100 000 mPas.

If organic solvents (B) are used, which can also facilitate the application of component (A), then preference is given to substantially aromatic-free, linear, branched or cyclic hydrocarbons or mixtures thereof. These hydrocarbons (B) more preferably have no substituted radicals. Furthermore, they preferably comprise more than 50 mol % of saturated carbon-carbon bonds.

The hydrocarbons (B) optionally used preferably each have, at a pressure of 1000 hPa, a boiling point of more than 150° C. or boiling ranges which start at 150° C., particularly when they are to be retained in the composition to be packaged, or boiling points up to 100° C. or boiling ranges ending at 100° C., when they are to be removed after application of component (A), wherein removal is carried out completely or only partially before or after filling and sealing the empty cartridge.

The removal of optionally used solvent (B) at temperatures up to 100° C. is possible but not preferred. Further or in addition, the removal of solvent (B) can be assisted by application of negative pressure, for examples at pressures of up to 5 mbar absolute pressure.

Examples of optionally used solvent (B) are either hydrocarbons having 13 to 23 carbon atoms, such as those commercially available from Total under the trade name Hydroseal with boiling ranges (measured at a pressure of approximately 1000 hPa) of 230 to 375° C. and viscosities of 2.4 to 10.3 mm²/s (measured at 40° C.) or hydrocarbons having 5 to 8 carbon atoms such as pentane, hexane, heptane, n-octane or 2-methyloctane, for example.

If solvents (B) are used for producing component (A), which is not preferred, amounts are preferably less than 90% by weight, more preferably less than 50%, especially less than 25%.

The invention further relates to hollow cylindrical containers filled with silicone compositions, characterized in that in the gap between the inner wall of the hollow cylindrical container and the outer surface of the plunger, with which said container is sealed, there is a silicone polymer (A) having a viscosity of 5000 mPas to 100,000 mPas, measured at 25° C.

In the process according to the invention, the silicone polymer (A) can be applied to the lower end of the empty cartridge prior to filling the empty cartridge and/or to the outer surface of the plunger wall after filling and prior to sealing the empty cartridge with the plunger. The silicone polymer (A) in this case can be applied to the appropriate surfaces by known methods, e.g. by rolling, spraying, brushing, painting or dipping.

If silicone polymer (A) is applied to the inner wall of the empty cartridge, it is preferably the section at the lower end, i.e. in a region from the lower end of the empty cartridge up to ca. 5 cm in the axial direction from the other end of the empty cartridge. However, if desired, silicone polymer (A)

can also be applied to the entire inner wall of the empty cartridge, but this is not preferred.

If silicone polymer (A) is applied to the inner wall of the empty cartridge, this is preferably carried out by brushing or painting.

If silicone polymer (A) is applied to the plunger, this is preferably carried out by brushing or painting.

The amount of silicone polymer (A) applied in accordance with the invention is preferably from 0.001 g/cm$^2$ to 0.5 g/cm$^2$, more preferably from 0.005 g/cm$^2$ to 0.1 g/cm$^2$, especially from 0.01 g/cm$^2$ to 0.02 g/cm$^2$.

In one variant of the process according to the invention (V1), silicone polymer (A) is applied exclusively to the inner wall of the empty cartridge prior to filling the empty cartridge.

In a further variant of the process according to the invention (V2), silicone polymer (A) is applied exclusively to the outer surface of the plunger wall prior to the sealing of the empty cartridge filled with the silicone composition with the plunger. Preference is given in this case to an amount of 0.005 g/cm$^2$ to 0.1 g/cm$^2$, especially 0.01 g/cm$^2$ to 0.1 g/cm$^2$.

In a further variant of the process according to the invention (V3), silicone polymer (A) is applied both to the empty cartridge inner wall at the lower end of the empty cartridge prior to filling the empty cartridge and to the outer surface of the plunger wall after filling and prior to sealing the cartridge with the plunger.

In the process according to the invention, preference is given to variant (V2).

The process according to the invention, including all variants, is preferably carried out under conditions which are typically used for filling silicone compositions, preferably at a pressure of the surrounding atmosphere, that is to say at approximately 1013 hPa, and at room temperature, i.e. at approximately 23° C., and at a relative atmospheric humidity of approximately 50%.

The invention further relates to a process for sealing the gap between the inner wall of a hollow cylindrical container and the outer surface of the plunger, with which said container is sealed, with a sealant, characterized in that the sealant is a silicone polymer (A) having a viscosity of 5000 mPas to 100,000 mPas, measured at 25° C.

Surprisingly, it has now been found that silicone polymers having a dynamic viscosity of 5000 mPas to 100 000 mPas, measured at 25° C., despite high water vapor permeability, are ideally suitable for permanently sealing the gap between plunger and the inner wall of the hollow cylindrical container and for ensuring the lubricity of the plunger over a long storage period.

The process according to the invention also has the advantage that commercial cartridge systems containing highly reactive sealants can be stored under challenging climatic conditions over long periods without the occurrence of undesirable reactions of the packaged silicone compositions.

The process according to the invention has the advantage that the plunger can be automatically introduced into the empty cartridge (so-called plunger placement) very easily.

The process according to the invention has the advantage that bubble-free filling of the sealant can be achieved, i.e. no air is enclosed between the plunger head and the sealant.

The process according to the invention has the advantage that no gas bubbles form between the plunger head and the sealant even in the case of frequent temperature change.

In the examples described below, all viscosity data, unless stated otherwise, refer to a temperature of 25° C. Unless stated otherwise, the examples below are carried out at a pressure of the surrounding atmosphere, i.e. at approximately 1013 hPa, and at room temperature, i.e. at approximately 23° C., and at a relative atmospheric humidity of approximately 50%. Furthermore, all parts and percentages are by weight, unless otherwise stated.

In the context of the present invention, the dynamic viscosity of the component (A) used according to the invention is measured in accordance with DIN 53019, unless otherwise stated, at 25° C. by means of a "Physica MCR 300" rotational rheometer from Anton Paar. A cone-plate measuring system (Searle system with measuring cone CP 50-1) is used for values greater than 200 mPa·s. The shear rate is adjusted to the polymer viscosity: 5000 to 9999 mPa·s at 62 1/s; 10,000 to 12,499 mPa·s at 50 1/s; 12,500 to 15,999 mPa·s at 38.5 1/s; 16,000 to 19,999 mPa·s at 33 1/s; 20,000 to 24,999 mPa·s at 25 1/s; 25,000 to 29,999 mPa·s at 20 1/s; 30,000 to 39,999 mPa·s at 17 1/s; 40,000 to 59,999 mPa·s at 10 1/s; 60,000 to 149,999 at 5 1/s.

After setting the temperature of the measuring system to the measurement temperature, a three-stage measurement program consisting of a run-in phase, pre-shear and viscosity measurement is applied. The run-in phase takes place by stepwise increase of the shear rate over one minute to the aforementioned shear rate, dependent on the viscosity to be expected, at which the measurement is intended to be carried out. Once this has been reached, the pre-shear is carried out at constant shear rate for 30 s, then 25 individual measurements are carried out, each for 4.8 seconds, for determination of the viscosity, from which the mean value is determined. The mean value corresponds to the dynamic viscosity which is stated in mPa·s.

Example 1

Filling

To investigate the efficiency of the process, a commercially available acetate-crosslinking silicone sealant, obtainable from Wacker Chemie AG, Munich, Germany, under the name ELASTOSIL® 6000, was filled into commercially available empty cartridges composed of polyethylene of the E310 type from Fischbach KG, Engelskirchen, Germany. The empty cartridges were filled using a commercially available filling system and sealed with an HDPE plunger of the K02 type from Fischbach. Immediately prior to this, an α,ω-bis(trimethylsiloxy)polydimethylsiloxane having a viscosity of 12,500 mPas was painted onto the outer circumference of the plunger wall using a brush. The amount of oil applied was 0.2 g. Thus, an application amount of ca. 0.01 g/cm$^2$ was achieved.

Storage

Subsequently, 10 samples of the cartridge systems thus obtained were stored for 8 weeks in a climate-controlled cabinet as follows: starting at 23° C. and 50% atmospheric humidity, they were cooled initially to 5° C. and 95% atmospheric humidity over one hour, then maintained at this level for 11 hours, then heated over one hour to 50° C. and 95% atmospheric humidity and in turn maintained for 11 hours. Subsequently, they were cooled to 5° C. and 95% rel. atmospheric humidity over one hour and this cycle was carried out in total for 8 weeks. Every 2 weeks, two cartridges were removed, conditioned at 23° C. and 50% relative atmospheric humidity for 24 h and cut lengthwise. The hardened material at the plunger head was removed, freed mechanically using a spatula from non-hardened material, and weighed. The mean values of the measurements are listed in Table 1.

Comparative Example 2

Filling

The experiment according to example 1 was repeated, with the modification that instead of α,ω-bis(trimethylsiloxy)polydimethylsiloxane having a viscosity of 12,500 mPas, an α,ω-bis(trimethylsiloxy)polydimethylsiloxane having a viscosity of 350 mPas was used.

Storage

The samples were stored as described in example 1. The mean values of the measurements are listed in Table 1.

Comparative Example 3

Filling

The experiment according to example 1 was repeated. The oiling of the plunger was omitted.

Storage

The samples were stored as described in example 1. The mean values of the measurements are listed in Table 1.

Comparative Example 4

Filling

The experiment according to example 1 was repeated with the modification that the cartridge was internally coated with a polybutene at its lower end.

Storage

The samples were stored as described in example 1. The mean values of the measurements are listed in Table 1.

Example 5

Filling

The experiment according to example 1 was repeated, with the modification that instead of α,ω-bis(trimethylsiloxy)polydimethylsiloxane having a viscosity of 12,500 mPas, an α,ω-bis(trimethylsiloxy)polydimethylsiloxane having a viscosity of 5000 mPas was used.

Storage

The samples were stored as described in example 1. The mean values of the measurements are listed in Table 1.

Example 6

Filling

The experiment according to example 1 was repeated, with the modification that instead of α,ω-bis(trimethylsiloxy)polydimethylsiloxane having a viscosity of 12,500 mPas, an α,ω-bis(trimethylsiloxy)polydimethylsiloxane having a viscosity of 60,000 mPas was used.

Storage

The samples were stored as described in example 1. The cartridges were subjected to the test described in example 1. The mean values of the measurements are listed in Table 1.

Example 7

Filling

The experiment according to example 1 was repeated, with the modification that instead of α,ω-bis(trimethylsiloxy)polydimethylsiloxane having a viscosity of 12,500 mPas, an α,ω-dihydroxypolydimethylsiloxane having a viscosity of 75,000 mPas was used.

Storage

The samples were stored as described in example 1. The mean values of the measurements are listed in Table 1.

Example 8

Filling

The experiment according to Example 1 was repeated with the modification that instead of α,ω-bis(trimethylsiloxy)polydimethylsiloxane having a viscosity of 12,500 mPas, a mixture of 85% by weight of an α,ω-bis(dimethoxymethylsiloxy)polydimethylsiloxane having a viscosity of 350,000 mPas and 15% by weight of an α,ω-bis(trimethylsiloxy)polydimethylsiloxane having a viscosity of 100 mPas was used, wherein the mixture had a viscosity of 80,000 mPas.

Storage

The samples were stored as described in example 1. The mean values of the measurements are listed in Table 1.

Example 9

Filling

The experiment according to example 1 was repeated with the modification that instead of α,ω-bis(trimethylsiloxy)polydimethylsiloxane having a viscosity of 12,500 mPas, a mixture of 90% by weight of an α,ω-dihydroxypolydimethylsiloxane having a viscosity of 75,000 mPas and 10% by weight of an α,ω-bis(trimethylsiloxy)polydimethylsiloxane having a viscosity of 12,500 mPas was used, wherein the mixture had a viscosity of 65,000 mPas.

Storage

The samples were stored as described in example 1. The mean values of the measurements are listed in Table 1.

Example 10

Filling

The experiment according to example 1 was repeated with the modification that instead of 0.2 g of silicone oil, 0.1 g of silicone oil was used, which corresponds to an application amount of ca. 0.005 g/cm$^2$, and the application was effected using an automatic roller device, with which a spongy, elastic rubber material was painted completely over the outer plunger wall.

Storage

The samples were stored as described in example 1. The mean values of the measurements are listed in Table 1.

TABLE 1

| Hardened material in [g] after | 2 weeks | 4 weeks | 6 weeks | 8 weeks |
| --- | --- | --- | --- | --- |
| Example 1 | 0.0 | 1.0 | 4.0 | 15.3 |
| Comparative example 2 | 0.0 | 2.3 | 8.0 | 28.4 |
| Comparative example 3 | 0.0 | 1.5 | 9.0 | 33.0 |
| Comparative example 4 | 0.0 | 16.5 | —* | 44.0 |
| Example 5 | 0.0 | 0.0 | 3.0 | 11.5 |
| Example 6 | 0.0 | 0.0 | 3.0 | 11.6 |
| Example 7 | 0.0 | 1.20 | 5.0 | 20.5 |
| Example 8 | 0.0 | 1.1 | 4.9 | 22.0 |
| Example 9 | 0.0 | 1.2 | 4.8 | 21.0 |
| Example 10 | 0.0 | 0.9 | 3.8 | 14.05 |

*)not measured

The invention claimed is:

1. A process for packaging silicone compositions in a cylindrical container having an inner wall which is sealed with a plunger having an outer surface which bears against the inner wall of the cylindrical container, comprising:
introducing, in a gap between the inner wall of the cylindrical container and the outer surface of the plunger, a composition comprising one or more silicone polymers (A), the composition having a viscosity of 5000 mPas to 100,000 mPas, measured at 25° C.;
introducing a curable silicone composition into the cylindrical container; and
sealing the cylindrical container, now containing the curable silicone composition, with the plunger.

2. The process of claim 1, wherein the silicone polymers (A) are essentially linear organopolysiloxanes.

3. The process of claim 1, wherein at least one silicone polymer (A) has the formula:

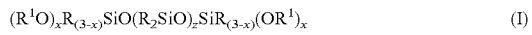

$(R^1O)_xR_{(3-x)}SiO(R_2SiO)_zSiR_{(3-x)}(OR^1)_x$     (I)

where
R are identical or different and are monovalent, SiC-bonded, optionally substituted hydrocarbon radicals,
$R^1$ are identical or different and are hydrogen or monovalent, optionally substituted hydrocarbon radicals, optionally interrupted by oxygen or nitrogen heteroatoms,
x is 0, 1, 2 or 3 and
z is an integer from 20 to 5000.

4. The process of claim 1, wherein at least one silicone polymer (A) is a bis(trialkylsiloxy)polydialkylsiloxane, α,ω-dihydroxypolydialkylsiloxane, bis(dialkoxyalkylsiloxy)polydialkylsiloxane, or is a mixture thereof.

5. The process of claim 1, wherein the amount of silicone polymer (A) applied is from 0.001 g/cm² to 0.5 g/cm².

6. The process of claim 1, wherein silicone polymer (A) is applied exclusively to the outer surface of the plunger outer surface prior to sealing the cartridge filled with the silicone composition with the plunger.

7. A cylindrical container filled with a curable silicone composition, wherein in a gap between an inner wall of the cylindrical container and an outer surface of a plunger with which said container is sealed, there is a silicone polymer composition having a viscosity of 5000 mPas to 100,000 mPas, measured at 25° C.

8. The process of claim 1, wherein the composition comprising one or more silicone polymers (A) consists of one or more silicone polymers (A) and optionally one or more organic solvents.

9. The cylindrical container filled with a curable silicone composition of claim 7, wherein the composition comprising one or more silicone polymers (A) consists of one or more silicone polymers (A).

* * * * *